(12) United States Patent
Reytier et al.

(10) Patent No.: US 8,246,056 B2
(45) Date of Patent: Aug. 21, 2012

(54) SUPERPLASTIC SEALING SYSTEM, PREFERENTIALY FOR ELECTROCHEMICAL CELL SYSTEM

(75) Inventors: Magali Reytier, Grenoble (FR); Raphaël Couturier, Sassenage (FR); Olivier Gillia, Sassenage (FR); Emmanuel Rigal, Saint Marin le Vinoux (FR)

(73) Assignee: Commissariat a l'Energie Atomique, Paris (FR)

( * ) Notice: Subject to any disclaimer, the term of this patent is extended or adjusted under 35 U.S.C. 154(b) by 828 days.

(21) Appl. No.: 12/333,470

(22) Filed: Dec. 12, 2008

(65) Prior Publication Data
US 2009/0155671 A1 Jun. 18, 2009

Related U.S. Application Data

(60) Provisional application No. 61/017,081, filed on Dec. 27, 2007.

(30) Foreign Application Priority Data

Dec. 13, 2007 (FR) ..................................... 07 5981 9

(51) Int. Cl.
*F16J 15/02* (2006.01)
(52) U.S. Cl. .................... 277/639; 277/647; 277/650
(58) Field of Classification Search .................. 277/639, 277/647, 650
See application file for complete search history.

(56) References Cited

U.S. PATENT DOCUMENTS

| | | | | |
|---|---|---|---|---|
| 3,512,789 A * | 5/1970 | Tanner | ........................... | 277/647 |
| 3,595,588 A * | 7/1971 | Rode | ............................. | 277/650 |
| 3,690,682 A * | 9/1972 | Ferrill | ............................ | 277/641 |
| 3,761,102 A * | 9/1973 | Nicholson | ..................... | 277/647 |
| 3,857,572 A * | 12/1974 | Taylor et al. | .................... | 277/609 |
| 3,915,462 A * | 10/1975 | Bruns et al. | .................... | 277/647 |
| 4,381,869 A * | 5/1983 | Abbes et al. | .................. | 277/639 |
| 4,602,888 A * | 7/1986 | Court et al. | ..................... | 403/28 |
| 4,660,805 A * | 4/1987 | Hahn et al. | ..................... | 251/328 |
| 5,433,370 A * | 7/1995 | Halling | ........................ | 228/155 |
| 5,716,052 A * | 2/1998 | Swensen et al. | ............. | 277/647 |
| 6,227,546 B1 * | 5/2001 | Halling | ........................ | 277/312 |
| 6,631,910 B2 * | 10/2003 | Caplain et al. | ................ | 277/644 |
| 6,857,639 B2 * | 2/2005 | Beeck et al. | .................. | 277/637 |
| 7,080,513 B2 * | 7/2006 | Reichert | ........................ | 60/722 |
| 7,195,246 B2 * | 3/2007 | Aoshiba et al. | ............... | 277/438 |
| 7,281,521 B2 * | 10/2007 | Neumaier | ..................... | 123/470 |
| 8,052,155 B2 * | 11/2011 | Amos et al. | .................. | 277/644 |
| 2004/0195782 A1 | 10/2004 | Bram et al. | | |

FOREIGN PATENT DOCUMENTS

| | | |
|---|---|---|
| DE | 2 135 695 | 1/1972 |
| WO | WO 03/032420 A2 | 4/2003 |
| WO | WO 2005/106999 A1 | 11/2005 |

\* cited by examiner

*Primary Examiner* — Alison Pickard
(74) *Attorney, Agent, or Firm* — Oblon, Spivak, McClelland, Maier & Neustadt, L.L.P.

(57) ABSTRACT

A seal intended to be inserted between a first and a second member, the seal including: two contact portions spaced from each other along a spacing direction, respectively intended to contact in a tight manner the first and second members, the contact portions being made of a first alloy displaying superplasticity properties under predetermined stress conditions including predetermined temperature conditions, the contact portions being supported by a support arranged therebetween, produced so as to display, under the predetermined temperature conditions, a greater mechanical compression resistance in the spacing direction than that of the contact portions.

24 Claims, 4 Drawing Sheets

SUPERPLASTIC SEALING SYSTEM, PREFERENTIALY FOR ELECTROCHEMICAL CELL SYSTEM

The invention relates generally to a seal intended to be inserted between two members of any kind, and preferentially between two members having different heat expansion coefficients.

The present invention applies more specifically, but not exclusively, to the field of electrochemical cell systems, preferentially high-temperature electrolyser type systems, also referred to as HTE, and/or of the fuel cell type, preferentially operating at high temperatures such as so-called SOFC (Solid Oxide Fuel Cell) cells.

A high-temperature water vapour electrolyser intended to produce hydrogen is known. For this purpose, it comprises a plurality of stacked electrochemical cells, each cell being provided with a porous anode and a porous cathode, and an electrolyte arranged between the anode and the cathode. In addition, each electrochemical cell has an associated anodic interconnector and cathodic interconnector, connected to the anode and the cathode respectively, each in tight contact with the electrolyte.

At the porous cathode of the electrolyser supplied with water vapour, water molecule dissociation takes place. The ions migrate via the solid electrolyte, generally made of ceramics, by means of the application of a suitable voltage, to recombine at the electrodes.

To prevent the recombination of hydrogen and oxygen, it is therefore envisaged to seal the connection between the electrolyte and the cathodic interconnector, and the connection between the electrolyte and the anodic interconnector, making it possible to simultaneously prevent the leakage of gases to the outside of the electrolyser, and mixing of the gases formed.

In this respect, it is noted that a substantially similar design is found on a fuel cell operating at high temperatures, given that it operates according to the opposite principle of that of the electrolyser.

To provide the tightness mentioned above, several constraints must be observed, particularly the application of a low force for the insertion and packing of the seal, to avoid damaging/rupturing the fragile ceramic electrolyte. However, this low force required is incompatible with metal solutions, given that same require a plastification of their contact surfaces to ensure the desired tightness, and this operation generally requires significant forces. In addition, the metal seal deformed plastically in this way, due to high forces, is sometimes not capable of ensuring tightness throughout the required period, due to creep of the constituent material of the seal.

To remedy these drawbacks at least partially, the invention relates to a seal intended to be inserted between a first and a second member, said seal comprising two contact portions spaced from each other along a spacing direction, respectively intended to contact in a tight manner said first and second members, said contact portions being made of a first alloy displaying superplasticity properties under predetermined stress conditions including predetermined temperature conditions, said contact portions being supported by a support arranged therebetween, produced so as to display, under said predetermined temperature conditions, a greater mechanical compression resistance in said spacing direction than that of said contact portions.

The invention generally provides the advantage of offering a very satisfactory compromise between the level of tightness capable of being obtained with the combination of the specific means used, and the low level of force required to achieve said level of tightness.

With such a design, the packing of the seal between the two members to be sealed may advantageously be performed by stressing the contact portions under said predetermined stress conditions, particularly with respect to the temperature and deformation/compression rate, in order to benefit from the superplasticity properties of the first alloy constituting said contact portions. In such a case, the support resisting compression better at this temperature, makes it possible to prevent the subsidence of the contact portions during packing and therefore favour the compression thereof between the members to be sealed and said support only being slightly deformed in the spacing direction. The contact portions may in this case be deformed locally in very significant proportions during the packing of the seal particularly intended to apply a pressure, in the spacing direction, between the two members intended to be sealed. The desired significant deformations favour increased tightness, as the latter make it possible to correct surface defects, alignment defects effectively and also make it possible to fill the surface roughness/bumps of the two members in question, between which tightness is required.

In other words, the invention makes it possible to obtain increased tightness due to the significant deformations of the contact portions, advantageously subject to a low force due to the superplasticity properties thereof. For this reason, the members in question are only subjected to low forces during the packing of the seal, carried out so that the contact portions are stressed under said predetermined stress conditions, particularly said predetermined temperature conditions and predetermined compression rate conditions, such that the damage/rupture risk thereof is significantly limited, even if either of said members is made of a fragile material, such as ceramics.

As such, it is observed that the level of force introduced in both members during the packing of the seal is approximately twenty times lower than that required to obtain a substantially similar tightness level, with a conventional metal seal solution.

Moreover, when the seal temperature is subsequently brought below said predetermined temperature conditions relative to the superplastic state of the first alloy, while remaining at a high temperature and under stress, the tightness obtained is retained, particularly due to the high mechanical resistance provided by the seal support, particularly due to the lack of creep thereof under a low stress level.

As an indication, it is observed that an alloy is deemed to offer superplasticity properties when its elongation capacity, under predetermined conditions, reaches 200%, potentially reaching values of up to the order of 2000%, or more. The predetermined conditions include those relating to temperature mentioned above, said temperature generally being greater than or equal to half the melting point of the alloy in question. They also include a low deformation/compression rate, of the order of $10^{-3}$ to $10^{-5}$ s$^{-1}$ for example, and low stresses with respect to those applied to standard materials during conventional methods, such as shaping by means of embossing, forging, etc. Again as an indication, one of the characteristics of these alloys is generally having a fine grain size, an alloy which remains stable during the superplastic deformation thereof.

Several superplastic alloys may be envisaged for the contact portions, including an alloy comprising the elements Fe, Ni in a proportion of 50 to 55%, Cr in a proportion of 17 to 21%, Nb in a proportion of 4.75 to 5.25%, Mo in a proportion of 2.8 to 3.3%, and Ti in a proportion of 0.65 to 1.15%, and preferentially displaying superplasticity properties around 950° C., the alloys belonging to the family referred to as Inconel® 718 SPF complying with this definition.

Other superplastic alloys may nevertheless be envisaged, such as titanium and/or aluminium based alloys, with superplasticity properties at temperatures or temperature intervals between 500° C. and 1000° C.

The seal support is preferentially metallic, made of a second alloy, for example the alloy referred to as Inconel® 718. However, the latter alloy, not displaying superplastic properties, displays elastic properties and high mechanical resistance properties at high temperatures, like the first alloy. As mentioned above, it is however ensured that at the predetermined temperature conditions relative to the superplastic state of the first alloy, the second alloy offers a greater mechanical compression resistance than that of the first alloy, in order to prevent the subsidence of the contact portions during the packing of the seal, and, therefore, favour the compression of the superplastic contact portions. As an indication, it is observed that the compression resistance of the support, in said spacing direction of the contact portions, is preferentially envisaged to be greater than that of the contact portions, irrespective of the stress mode applied under the predetermined temperature conditions. This characteristic is particularly verified when the selected stress/compression mode for the seal makes it possible to obtain said predetermined compression rate conditions for the contact portions.

It is preferentially envisaged that, under said predetermined superplasticity conditions, the limit of elasticity is approximately ten times lower for the contact portions than for the support in the second alloy.

Preferentially, the seal comprises means authorising a relative movement between said two contact portions, along a radial direction orthogonal to the spacing direction between said two contact portions. Firstly, this implies that the seal is produced such that the spacing direction corresponds to the axial direction, even though this is not necessarily the case. In particular, the spacing direction of the contact portions could alternatively correspond to the radial direction of the seal, without leaving the scope of the invention.

In the first case mentioned above, a certain flexibility of the seal is therefore preferentially provided in said radial direction, as opposed to the need for a high rigidity in the spacing direction or axial direction, required to maintain tightness. Various technical solutions may be envisaged to achieve such an aim, some of which will be described below.

As a general rule, the authorisation of said relative movement between the contact portions, along the radial direction, makes it possible to accompany any relative movements of both members in the same direction, liable to result for example from a differential heat expansion. Nevertheless, it is observed that the invention does not only apply to cases where both members arranged at either end of the seal display different heat expansion coefficients, particularly for the field of electrochemical cell systems.

According to a first preferred embodiment of the present invention, said two contact portions are made of one piece with an intermediate portion connecting them, to jointly form an external seal structure.

In such a case, it is preferentially envisaged for said intermediate portion of the external seal structure to have a cross-section in the shape of a C, double C or Σ, or any other shape enabling the easy deformation thereof, in the radial direction. As a result, it should be understood that the flexible intermediate portion, comprising the two contact portions, forms all or part of the abovementioned means authorising a relative movement between the two contact portions, along a radial direction.

Preferentially, said support is arranged in said external structure, next to and in contact with the two contact portions. In such a case, it is preferentially envisaged for said support to display with said two contact portions of said external structure, two non-sliding mechanical connections, respectively. These connections, not necessarily tight, may be mere supports, or rigid connections such as welded connections.

Preferentially again, said support adopts in the cross-section thereof the shape of a vertically tapered C, the two end portions of the C being in contact with said contact portions, respectively.

With such a configuration, in the event of differential heat expansion of the two members, the two contact portions may be moved with respect to each other in the radial direction, by means of deformation/deflection of the external structure, and more specifically of the intermediate portion thereof. At the same time, no movement occurs between the contact portions and the associated members thereof, or between said portions and the support arranged internally in the external structure, such that the tightness is perfectly preserved, particularly by means of the axial rigidity provided by the support between the two contact portions. It is observed that the non-sliding connection between each contact portion and the support is not necessary, the aim being nevertheless to be able to ensure that said support always applies a sufficient force on the contact portions to maintain tightness, and therefore prohibit the sliding of said portions of the members between which tightness is required, even in the case of relative movement of the two members along the radial direction.

According to a second preferred embodiment of the present invention, said two contact portions are connected with each other by two opposite side flanks, jointly forming with each contact portions an external seal structure. Preferentially, said external seal structure has a cross-section in the general shape of a rectangle or square.

In such a case, said support is preferentially arranged in said external structure, next to and in contact with the two contact portions, preferentially such that this support displays, with said two contact portions of said external structure, two sliding mechanical connections, respectively.

Preferentially again, said support displays a substantially tubular shape, the opposite end faces thereof being in contact with the two contact portions respectively.

Finally, it is envisaged for each side flank to be mounted at the ends thereof on both contact portions, via two tight and flexible mechanical connections, respectively.

With such a configuration, in the event of a differential heat expansion of both members, the two contact portions may be moved with respect to each other in the radial direction, by means of deformation/deflection of the external structure, and more specifically by means of deformation of the abovementioned mechanical connections, and inclinations of the associated side flanks. In other words, the square or rectangular cross-section of the external structure, adopted under normal conditions, is changed slightly into a parallelogram type cross-section. This parallelogram deformation is authorised by the sliding of either of the contact portions along the associated support end thereof, while at the same time, no movement occurs between the contact portions and the associated members thereof. Consequently, the tightness is perfectly preserved, particularly due to the axial rigidity provided by the support between the two contact portions.

In this way, for said second embodiment, the means authorising a relative movement between the two contact portions, along a radial direction, are based on the principle of sliding between the constituent members of the seal, combined with a deformation of the external structure.

Preferentially, irrespective of the preferred embodiment adopted, the seal displays a substantially annular shape.

The invention also relates to any assembly comprising at least one seal as described above, inserted between a first and a second member, said assembly forming for example a part of an electrochemical cell system. Preferentially, the first and second members are respectively made of materials displaying different heat expansion coefficients. For example, the first and second members are respectively made of metal and ceramics, as is usually the case for electrochemical cell systems, of the electrolyser and/or fuel cell type operating at high temperatures.

In this respect, the invention also relates to an electrochemical cell system comprising at least one seal as described above. Preferentially, it comprises at least one electrochemical cell provided with an anode, a cathode, and an electrolyte arranged between the anode and the cathode, an anodic interconnector and a cathodic interconnector being associated with said electrochemical cell, connected to the anode and the cathode, respectively, said system also comprising at least one seal as described above, placed between said electrolyte and the anodic interconnector, and/or between said electrolyte and the cathodic interconnector. Preferentially, two separate seals are provided for both of the abovementioned positions, respectively.

As mentioned above, the system may be a high temperature electrolyser, or a fuel cell operating at high temperatures, for example of the SOFC type.

Finally, the invention also relates to a method for fitting a seal as described above, intended to be inserted between a first and second member of an electrochemical cell system operating at an operating temperature below said predetermined temperature conditions, said method comprising the following steps:

fitting of the seal between the first and second members;
increase in the temperature so as to bring the seal to the packing temperature according to the predetermined temperature conditions;
maintenance of the temperature at said packing temperature and application of a pressure on said electrochemical cell system, so as to obtain a compression of said contact portions of the seal; and
reduction of the temperature so as to bring the seal to said system operating temperature, while maintaining a pressure on said electrochemical cell system.

Naturally, the pressure on said electrochemical cell system is preferentially applied such that stress of contact portions results under said predetermined deformation/compression conditions, thus making it possible to benefit from the superplasticity properties of the first alloy forming said contact portions.

Preferentially, said packing temperature is set at around 950° C., and more generally between 500° C. and 1000° C. depending on the materials selected, and said operating temperature is set around 800° C., and more generally between 600 and 850° C., while always remaining below said packing temperature.

Other advantages and characteristics of the invention will emerge in the detailed, non-limitative, description below.

The description will be given with reference to the appended figures wherein.

Figure 1:
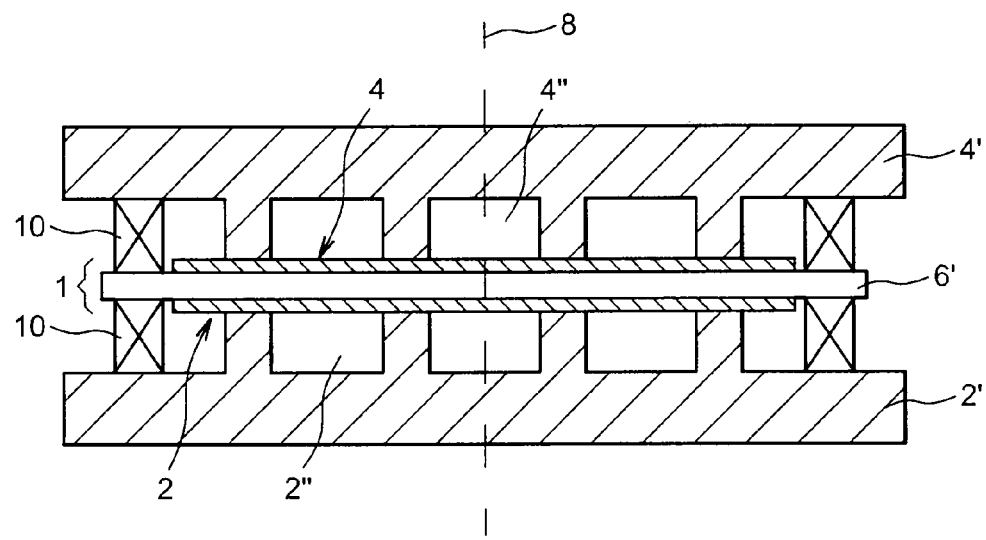
FIG. 1 represents a schematic sectional view of an electrochemical cell of a high-temperature electrolyser, cooperating at either end with interconnectors via two seals according to the present invention.

Firstly with reference to FIG. 1, an electrochemical cell 1 of a high-temperature electrolyser, preferentially of a so-called plane geometry, is observed schematically.

The general design thereof is known, i.e. it comprises a porous anode 2, a porous cathode 4, and an electrolyte 6 arranged in contact between the anode and the cathode. These parts, preferentially circular in shape, are stacked in a stacking direction corresponding to the axis 8 thereof.

This cell 6 has an associated anodic interconnector 2' pressed against the anode, and defining therewith an anodic chamber or compartment 2" via which the fluid may circulate. Similarly, a cathodic interconnector 4' pressed against the cathode, and defining therewith a cathodic chamber or compartment 4" via which the fluid may circulate is provided.

Conventionally, the interconnectors 2', 4' are metallic, while the solid electrolyte is made of ceramics.

To ensure the tightness of the compartments 2", 4", a seal 10 is provided between the electrolyte 6 and the interconnector 2', along with another seal 10, of an identical or similar design, between the electrolyte 6 and the interconnector 4'. These seals are preferentially annular, with an axis 8, arranged on the periphery of the stack, and more specifically radially outwards with respect to the anode and the cathode.

The specificity of the invention lies in the design of said seals 10, one of which will be described below, via two preferred embodiments.

Figure 2:
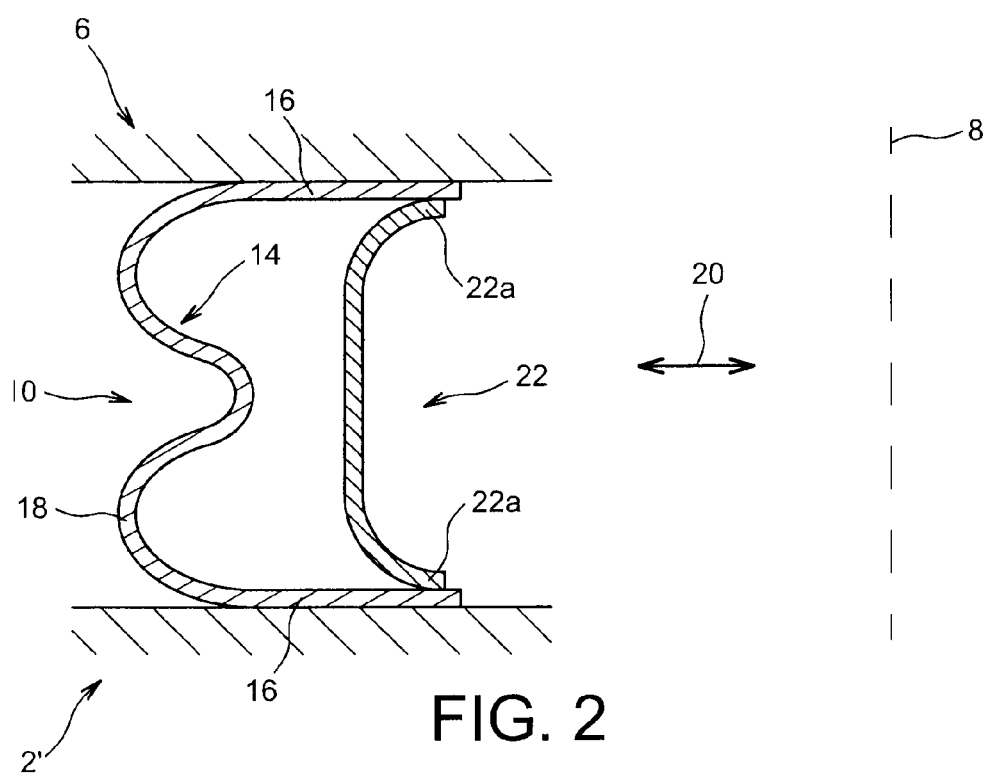
FIG. 2 represents a detailed sectional view of one of the two seals illustrated in FIG. 1, the seal being in the form of a first preferred embodiment of the present invention, in the non-stressed configuration.

Firstly, with reference to FIG. 2 representing a first preferred embodiment of the present invention, it can be seen that the seal 10 displays a one-piece external structure 14, at the ends whereof two contact portions 16 are located respectively. These two portions 16 are respectively in external contact with the bottom surface of the electrolyte 6, and with the top surface of the anodic interconnector 2', the tight contacts being preferentially of the surface type, and more preferentially plane and annular, orthogonal to the axis 8.

The portions 16, spaced from each other along a spacing direction corresponding to the axial direction 8, are connected to each other by an intermediate portion 18, displaying a flexibility in a radial direction represented schematically by the arrow 20, and orthogonal and secant to the axis 8. To ensure this flexibility, it is preferentially ensured that this portion 18 has a cross-section in the shape of a double C as shown in FIG. 2, although other shapes providing such flexibility may be envisaged, without leaving the scope of the invention.

This one-piece external structure 14 is made of a first alloy displaying superplasticity properties under predetermined stress conditions, i.e. predetermined temperature conditions and predetermined deformation/compression rate conditions.

Preferentially, it consists of an alloy comprising the elements Fe, Ni in a proportion of 50 to 55%, Cr in a proportion of 17 to 21%, Nb in a proportion of 4.75 to 5.25%, Mo in a proportion of 2.8 to 3.3%, and Ti in a proportion of 0.65 to 1.15%, and preferentially displaying superplasticity properties at around 950° C., such as alloys belonging to the family referred to as Inconel® 718 SPF.

The seal 10 is completed by a seal support 22, arranged internally in the structure 14, next to and in contact with the two portions 16. It preferentially displays in the cross-section thereof the shape of a vertically tapered C, in this case in the direction of the axis 8, the two end portions 22a of the C being in contact with the internal surfaces opposite the two contact portions 16, respectively.

While the shape of the support 22 may be different to that described above, it is selected so as to offer a rigidity in the direction of the axis 8, even at high temperatures, i.e. over 500° C. As a general rule, under predetermined temperature conditions relative to the superplastic state of the first alloy, therefore preferentially at around 950° C., said support 22 is envisaged to offer a greater mechanical compression resistance, along the axial direction 8, than that of the portions 16, in order to prevent the subsidence thereof, particularly in order to compress same in the direction of the associated members 2, 6 thereof, in order to establish the tightness as detailed below.

Preferentially, the support is made with a second alloy, such as the alloy referred to as Inconel® 718, with preferentially, under predetermined superplasticity stress conditions of the first alloy, a limit of elasticity approximately ten times higher for the support than for the same portions.

Preferentially, the ends 22a of the support 22 each have, with the associated portion 16 thereof, a preferentially non-sliding mechanical connection. It may consist of a rigid connection or a mere support, extending in both cases in an annular manner, centred on the axis 8.

The method for fitting the seal 10 between the electrolyte 6 and the interconnector 2' is firstly initiated by the cold positioning thereof between said two members, as schematised in FIG. 2. A slight play may exist at this stage, between the seal 10 and one of the members 2', 6. Then, the assembly placed in a furnace equipped with a press is subjected to an increase in temperature, so as to reach a packing temperature of the order of 950° C., within the scope of the associated predetermined temperature conditions relating to the superplastic range of the first alloy. Once this packing temperature has been reached in the furnace, the various components of the assembly which are subject to free heat expansion with respect to each other, particularly in the radial direction, are maintained at this packing temperature, while being subjected to a pressure force applied by the furnace press, or by any other means known to those skilled in the art.

Figure 3A:
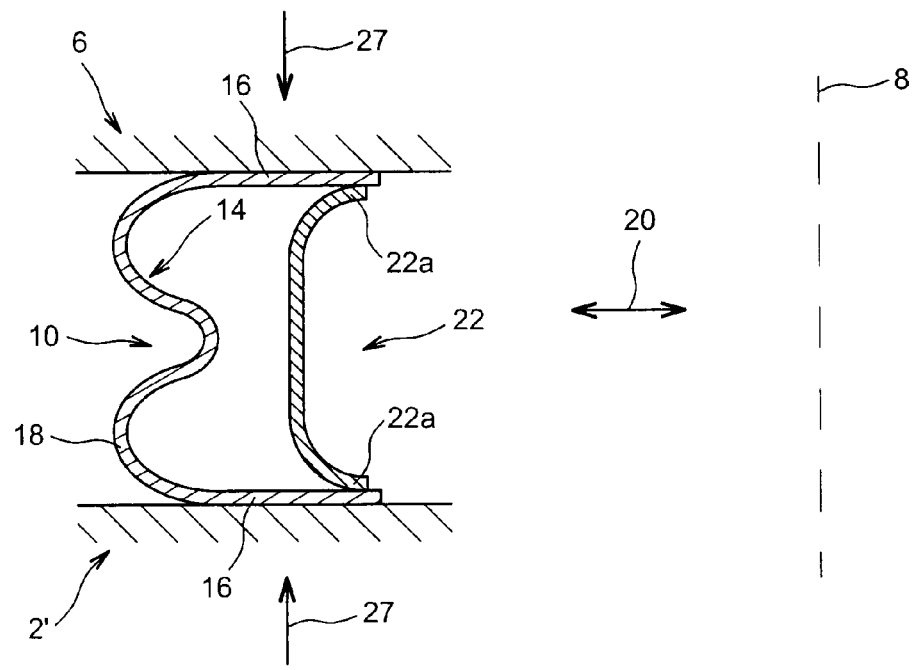
FIGS. 3a and 3b represent view schematising several successive steps of a seal fitting method shown in FIG. 2, according to a preferred embodiment of the present invention.

This pressure force along the axis 8 is applied on the electrochemical cell system so as to result in stress of the contact portions 16 under the predetermined deformation/compression conditions, i.e. at low rates, thus making it possible to benefit from the superplasticity properties of the first alloy forming said contact portions. This pressurisation step at the packing temperature, schematised by the arrows 27 in FIG. 3a, is implemented until the desired level of deformation of the contact portions 16 is achieved, corresponding to the required level of tightness. On the other hand, during this step, due to the high mechanical resistance along the axis 8, the support 22 is only compressed to a very small extent, and therefore favours the compression of the contact portions 16 supported at the ends thereof.

As an indication, the pressure force applied along a circular line, next to the seal, may be of the order of 3 N/mm, and adjusted so as to obtain a compression rate of the portions 16 between $10^{-3}$ and $10^{-5}$ $s^{-1}$.

The furnace temperature is then decreased to the electrochemical cell system operating temperature, i.e. approximately 800° C., while maintaining a pressure force which is preferentially the same as that adopted during the previous step, even though this is not necessarily the case, without leaving the scope of the invention.

During this decrease in the temperature, a differential heat expansion of the two members 2', 6 in the radial direction 20 is observed, the effect of said differential expansion in the axial direction remaining negligible.

Figure 3B:
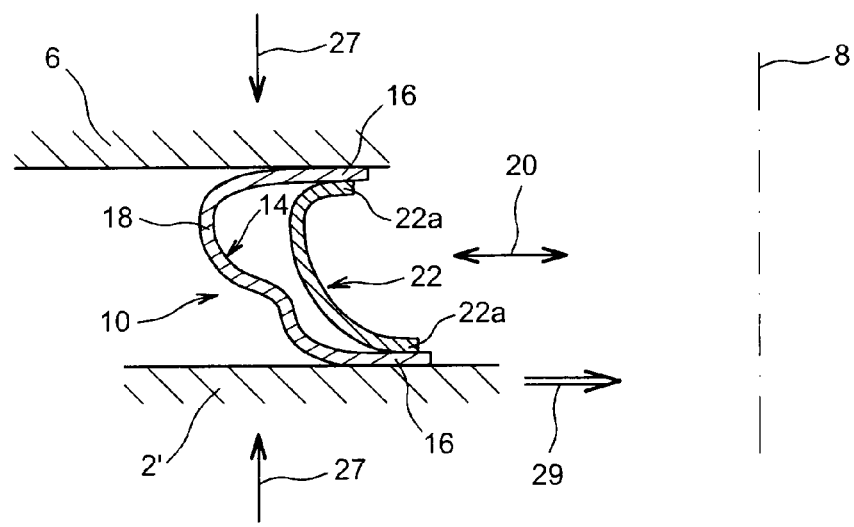

More specifically, as schematised in a voluntarily exaggerated fashion for clarity purposes in FIG. 3b, the interconnector 2' tends to retract more towards the axis 8 than the electrolyte 6, as schematised by the arrow 29. This results in a movement of the two contact portions 16 with respect to each other in the radial direction 20, said movement being authorised by the deformation/deflection of the intermediate portion 18 of the external structure 14. The curvatures of said intermediate portion 18 tend to be flattened, as can be seen in FIG. 3b. Simultaneously, no movement occurs between the contact portions 16 and the associated members 2', 6 thereof, or between said portions 16 and support 22, such that the tightness is perfectly preserved, particularly again due to the axial rigidity provided by said support 22. Preferentially, during the differential heat expansion, no sliding is observed between the contact portions 16 and the support 22, even though such a sliding could be envisaged, without leaving the scope of the invention.

Once the operating temperature has been reached, the seal 10 is fixed in the deformed position thereof shown in FIG. 3b, and still pressurised. The electrochemical cell system can then operate.

Figure 4:
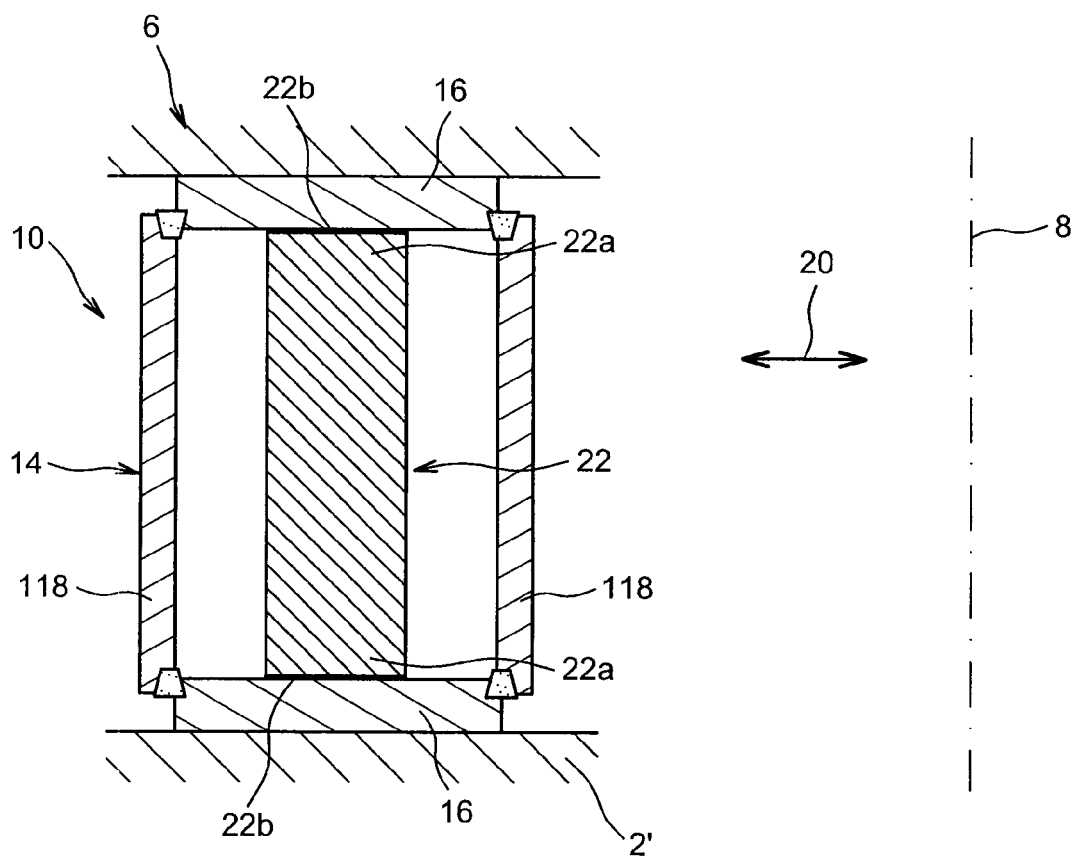
FIG. 4 represents a detailed sectional view of one of the two seals shown in FIG. 1, the seal being in the form of a second preferred embodiment of the present invention, in a non-stressed configuration.

With reference to FIG. 4 representing a second preferred embodiment of the present invention, it can be seen that the seal 10 displays an external structure 14, at the ends whereof two contact portions 16 are located respectively. These two portions 16 are respectively in external contact with the bottom surface of the electrolyte 6, and with the top surface of the interconnector 2', the tight contacts being preferentially of the surface type, and more preferentially plane and annular, orthogonal to the axis 8.

The portions 16, again spaced from each other along a spacing direction corresponding to the axial direction 8, are connected to each other by two side flanks 118, one internal and the other external, of an annular shape and each centred on the axis 8. These flanks 118, extending axially, i.e. along the direction of the axis 8, are each fixed at the ends thereof at the two portions 16 respectively, on the radial ends thereof. Consequently, in the non-stressed state of the external structure 14 shown in FIG. 4, said structure displays a cross-section in the general shape of a rectangle or square. The mechanical connection adopted between the radial ends of the portions 16 and the axial ends of the flanks 118 is preferentially tight and flexible, for example of the welding type.

In addition, the external side flank is substantially radially offset outwards with respect to the contact portions 16, whereas the internal side flank is substantially radially offset inwards with respect to said portions. This enables a so-called "parallelogram" deformation of the external structure 14, thus enabling the flexibility thereof in the radial direction 20, and therefore the following of any relative radial movement between the anodic interconnector 2' and the electrolyte 6, as detailed below.

The portions 16 of the external structure 14 are made of the first superplastic alloy described above, whereas the flanks may be made of any alloy compatible with welding to the superplastic material, the simplest solution proving to be the use of the same superplastic alloy as that of the contact portions 16.

The seal 10 is completed by a seal support 22, arranged internally in the structure 14, next to and in contact with the two portions 16. It preferentially displays a tubular shape, for example a ring with an axis 8 having a square or rectangular cross-section, including the two opposite faces 22b, 22b of the axial end 22a, 22a, preferentially plane and orthogonal to said axis 8, by means of deformation/deflection of the external structure, and more specifically by means of deformation of the abovementioned mechanical connections, and inclinations of the associated side flanks. In other words, the square or rectangular cross-section of the external structure, adopted under normal conditions, is changed slightly into a parallelogram type cross-section. This parallelogram deformation is authorised by the sliding of either of the contact portions along the associated support end thereof, while at the same time, no movement occurs between the contact portions 16 and the associated members thereof 2', 6. Consequently, the tightness is perfectly preserved, particularly due to the axial rigidity provided by the support between the two contact portions.

While the shape of the support 22 may be different to that described above, it is in this case also selected so as to offer a rigidity in the direction of the axis 8, even at high temperatures, i.e. above 500° C. As a general rule, under predetermined temperature conditions relative to the superplastic state of the first alloy, therefore preferentially at around 950° C., said support 22 is envisaged to offer a greater mechanical compression resistance than that of the portions 16, in order to prevent the subsidence thereof, particularly in order to compress same in the direction of the associated members 2, 6 thereof.

Preferentially, the support 22 is made of the second alloy mentioned above.

Figure 5A:
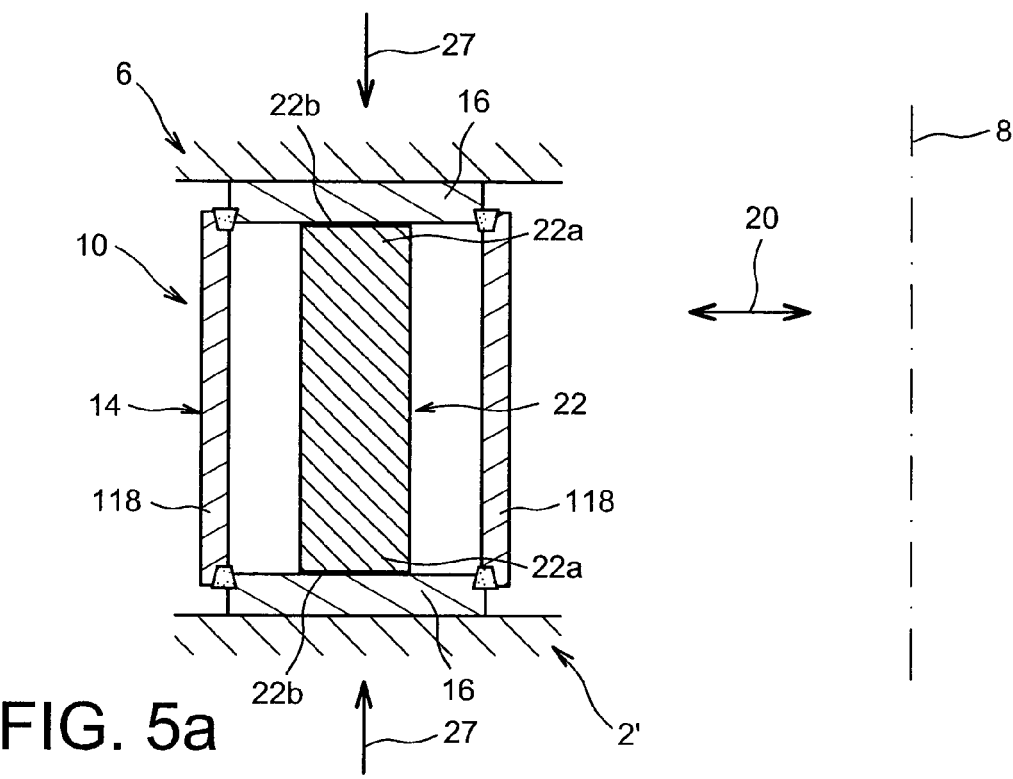
FIGS. 5a and 5b represent views schematising several successive steps of a seal fitting method shown in FIG. 4, according to a preferred embodiment of the present invention.
Figure 5B:
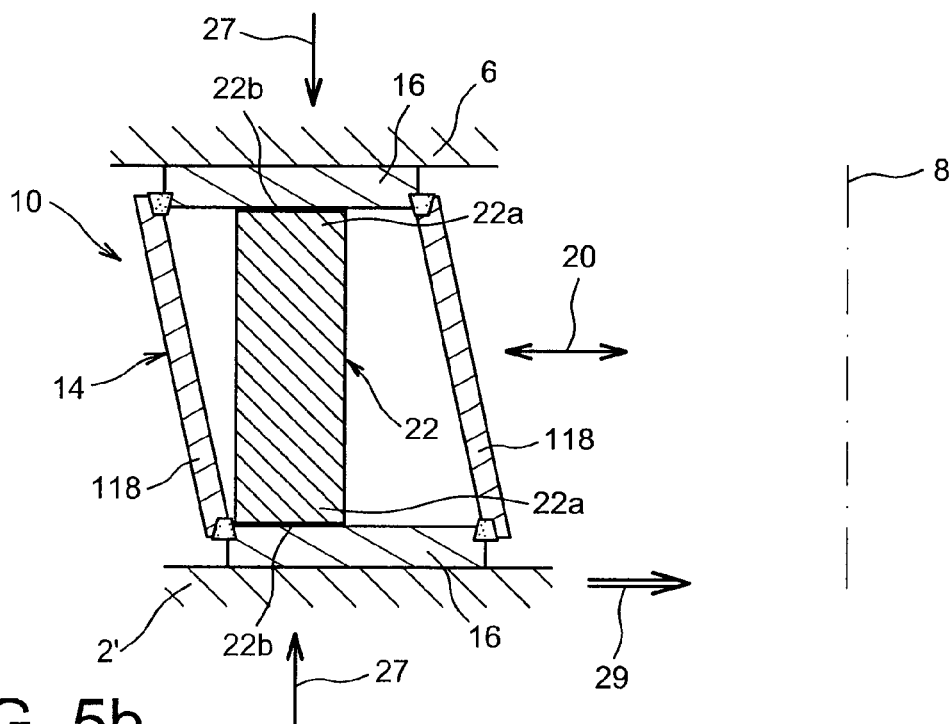

The method for fitting this seal is comparable to that described above, particularly in that it successively comprises the positioning of the seal between the members 2', 6, the temperature rise until the packing temperature is obtained, maintenance at the packing temperature combined with pressurisation schematised in FIG. 5a by the arrows 27, serving to deform under low stress levels the contact portions 16 in order to obtain the required tightness, and the decrease in the furnace temperature to the operating temperature, while maintaining the pressure, and before operating the electrochemical cell system.

In this case, the difference lies in the behaviour of the seal 10 during the temperature reduction step, during which a differential heat expansion of the two members 2', 6, in the radial direction 20 is observed, with the interconnector 2' retracting more towards the axis 8 than the electrolyte 6, as schematised by the arrow 29. This also results in a movement of the two contact portions 16 with respect to each other in the radial direction 20, by means of deformation of the abovementioned mechanical connections, and inclinations of the associated side flanks 118. More specifically, the square or rectangular cross-section of the structure 118, 118, 16, 16, adopted under non-stressed conditions, is changed slightly into a parallelogram type cross-section. This parallelogram deformation is authorised by the sliding of either of the contact portions 16 along the associated face 22b of the axial end 22a of the support. Simultaneously, no movement between the contact portions 16 and the associated elements 2', 6 thereof advantageously occurs. In this way, the tightness is perfectly preserved, again particularly due to the axial rigidity provided by the support 22 between the two contact portions 16, and by means of the sliding between the constituent members of the seal.

Naturally, various modifications may be made by those skilled in the art to the invention described above, only in the form of non-limitative examples.

The invention claimed is:

1. A seal intended to be inserted between a first and a second member, said seal comprising:
   two contact portions spaced from each other along a spacing direction, respectively intended to contact in a tight manner said first and second members, said contact portions being made of a first alloy displaying superplasticity properties under predetermined stress conditions including predetermined temperature conditions, said contact portions being supported by a support arranged therebetween, produced so as to display, under said predetermined temperature conditions, a greater mechanical compression resistance in said spacing direction than that of said contact portions.

2. The seal according to claim 1, further comprising means for authorising a relative movement between said two contact portions, along a radial direction orthogonal to said spacing direction.

3. The seal according to claim 2, wherein said two contact portions are made of one piece with an intermediate portion connecting them, to jointly form an external seal structure.

4. The seal according to claim 3, wherein said intermediate portion of the external seal structure has a cross-section in a shape of a C, double C or Σ.

5. The seal according to claim 3, wherein said support is arranged in said external structure, next to and in contact with the two contact portions.

6. The seal according to claim 5, wherein said support displays with said two contact portions of said external structure, two non-sliding mechanical connections, respectively.

7. The seal according to claim 3, wherein said support adopts in the cross-section thereof a shape of a vertically tapered C, the two end portions of the C being in contact with said contact portions, respectively.

8. The seal according to claim 1, wherein said two contact portions are connected with each other by two opposite side flanks, jointly forming with each of said contact portions an external seal structure.

9. The seal according to claim 8, wherein said external seal structure has a cross-section in a general shape of a rectangle or square.

10. The seal according to claim 8, said support is arranged in said external structure, next to and in contact with the two contact portions.

11. The seal according to claim 10, wherein said support displays with said two contact portions of said external structure, two sliding mechanical connections.

12. The seal according to claim 8, wherein said support displays a substantially tubular shape, opposite end faces thereof being in contact with the two contact portions respectively.

13. The seal according to claim 8, wherein each side flank is mounted at the ends thereof on both contact portions, via two tight and flexible mechanical connections, respectively.

14. The seal according to claim 1, wherein said first alloy is an alloy comprising Fe, Ni in a proportion of 50 to 55%, Cr in a proportion of 17 to 21%, Nb in a proportion of 4.75 to 5.25%, Mo in a proportion of 2.8 to 3.3%, and Ti in a proportion of 0.65 to 1.15%, the first alloy displaying superplasticity properties at around 950° C.

15. The seal according to claim 1, wherein said support is metallic and made of a second alloy.

16. The seal according to claim 1, wherein the seal displays a substantially annular shape.

17. An assembly comprising:
  at least one seal (10) according to claim 1, inserted between the first and the second member.

18. The assembly according to claim 17, wherein the first and second members are respectively made of materials displaying different heat expansion coefficients.

19. The assembly according to claim 18, wherein the first and second members are respectively made of metal and ceramics.

20. An electrochemical cell system comprising at least one seal according to claim 1.

21. The system according to claim 20, further comprising:
  at least one electrochemical cell provided with an anode, a cathode, and an electrolyte arranged between the anode and the cathode, an anodic interconnector and a cathodic interconnector being associated with said electrochemical cell, connected to the anode and the cathode, respectively, said system also comprising said at least one seal placed between said electrolyte and the anodic interconnector, and/or between said electrolyte and the cathodic interconnector.

22. The system according to claim 21, wherein the system is a high temperature electrolyser, or a fuel cell operating at high temperatures.

23. A method for fitting a seal according to claim 1, intended to be inserted between a first and second member of an electrochemical cell system operating at an operating temperature below said predetermined temperature conditions, said method comprising the following steps:
  fitting of the seal between the first and second members;
  increasing the temperature so as to bring the seal to the packing temperature according to the predetermined temperature conditions;
  maintaining the temperature at said packing temperature and application of a pressure on said electrochemical cell system, so as to obtain a compression of said contact portions of the seal; and
  reducing the temperature so as to bring the seal to said system operating temperature, while maintaining a pressure on said electrochemical cell system.

24. The method according to claim 23, wherein said packing temperature is set at around 950° C., and in that said operating temperature is set at around 800° C.

* * * * *